US010589363B2

(12) United States Patent
Beydler et al.

(10) Patent No.: US 10,589,363 B2
(45) Date of Patent: Mar. 17, 2020

(54) UNIVERSAL TOOL FOR REMOVING BROKEN THREADED FASTENERS

(71) Applicants: Scott A. Beydler, Lebanon, OR (US); Andrea M. Beydler, Lebanon, OR (US)

(72) Inventors: Scott A. Beydler, Lebanon, OR (US); Andrea M. Beydler, Lebanon, OR (US)

(73) Assignee: Beydler CNC, Esmont, VA (US)

( * ) Notice: Subject to any disclaimer, the term of this patent is extended or adjusted under 35 U.S.C. 154(b) by 251 days.

(21) Appl. No.: 15/397,616

(22) Filed: Jan. 3, 2017

(65) Prior Publication Data
US 2018/0185931 A1 Jul. 5, 2018

(51) Int. Cl.
*B23B 51/00* (2006.01)
*B23B 47/28* (2006.01)

(52) U.S. Cl.
CPC ........ *B23B 51/0054* (2013.01); *B23B 47/284* (2013.01)

(58) Field of Classification Search
None
See application file for complete search history.

(56) References Cited

U.S. PATENT DOCUMENTS

| | | | |
|---|---|---|---|
| 2,560,382 A * | 7/1951 | Barr | B23B 47/28 33/443 |
| D690,180 S | 9/2013 | Del Rossa | |
| D694,084 S | 11/2013 | Del Rossa | |
| 9,132,487 B2 | 9/2015 | Beydler et al. | |
| 2007/0030486 A1* | 2/2007 | Gelbart | B23Q 17/2233 356/399 |
| 2009/0274526 A1* | 11/2009 | Jenkins | B23B 47/284 408/115 B |
| 2014/0169908 A1* | 6/2014 | Wong | F16B 37/044 411/85 |
| 2016/0339573 A1 | 11/2016 | Del Rossa | |

OTHER PUBLICATIONS

Amazon Sliding Fastener, found at https://web.archive.org/web/20151227225448/https://www.amazon.com/1-4-20-Oval-Nut-10-pack/dp/B0036B2NL4, attached as pdf (Year: 2015).*
Quarter Turn L Shaped Toggle Arm, found at http://www.industrilas.com/en-us/MainMenu/Products/Chapter-2, attached as pdf (Year: 2019).*

* cited by examiner

*Primary Examiner* — Brian D Keller
(74) *Attorney, Agent, or Firm* — Mersenne Law

(57) ABSTRACT

A guide for drilling holes into broken threaded fasteners includes an oblong bar having a stepped slot along its length and a drill guide at one end. Securing sliders travel along the stepped slot and are secured to a structure to be repaired by threaded fasteners through the sliders. Once secured with the drill guide aligned over the broken threaded fastener (possibly with the assistance of an optical sighting device to mark the central axis of the drill guide), the operator drills through the drill guide and into the broken fastener. The tool is removed and the broken fastener can be extracted by various means.

15 Claims, 5 Drawing Sheets

UNIVERSAL TOOL FOR REMOVING BROKEN THREADED FASTENERS

CONTINUITY AND CLAIM OF PRIORITY

This is an original U.S. patent application.

FIELD

The invention relates to tool-guiding structures adapted to contact the work. More specifically, the invention relates to jigs adapted to be secured to a surface, having a guide for cutting by use of a rotating axially-moving tool, said jig configured to be fixed to the surface by a threaded fastener.

BACKGROUND

Threaded fasteners such as bolts and studs are widely used to connect, attach and secure machine subassemblies to each other. Bolts can be used alone (e.g., screwed into threaded holes in a structure) or with complementary threaded elements such as nuts, to apply a compressive force between facing surfaces, to resist shear forces acting to slide one element across the other, or to provide (and/or resist) a combination of forces.

Bolts are usually made of a tough material with a high tensile strength, sized well in excess of the design loads expected to be encountered in the particular application, but wear, fatigue, unexpected loading and over-zealous tightening occasionally cause breakage. If both ends of the bolt are accessible, then the broken bolt can be removed and replaced simply, but it often occurs that a portion of a threaded fastener is left threaded inside a blind hole after a break. Sometimes these fragments can be teased out by careful manipulation with a pick, but more commonly, it is necessary to drill into the fastener body and either collapse the outer threaded shell of the fastener or insert a reverse-threaded extraction tool into the hole to assist in removing the fragment.

Because threaded fasteners are usually made of a tough material, it can be difficult to drill extraction holes. When the assembly containing the broken fastener can be moved, improved drilling results are often obtained by securing the assembly to a sturdy machine such as a drill press. However, broken bolts are often encountered in machinery like vehicle engines, where it is impractical to dismantle the assembly so that the bolt can be drilled on a stationary press.

For situations like this, a hand drill may be the next best alternative, but drilling into a tough, small-diameter cylinder (which is often located in an awkward or practically inaccessible spot) without breaking the drill bit or damaging the threading of the bolt hole, can be challenging. A number of universal guides for drilling these sorts of holes are known in the art (see, e.g., U.S. Pat. No. 7,229,237 to Charles Fulgham) but all suffer from drawbacks as discussed below. An improved tool for drilling broken-fastener extraction holes may be of value in this field.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention are multi-part tools adapted to securely hold a drill guide near a predetermined location of a structure, so that a broken threaded fastener at that location can be drilled out and removed. Embodiments are simpler and more stable than existing tools such as the drill guide described by Fulgham in U.S. Pat. No. 7,229,237. Drill-guide positioning accuracy is not as good as that achievable with an application-specific template such as the one described by inventor Beydler in U.S. Pat. No. 9,132,487, but the universal nature of the tool described here offers a reasonable balance between applicability, accuracy, stability and drill control.

Figure 1A:
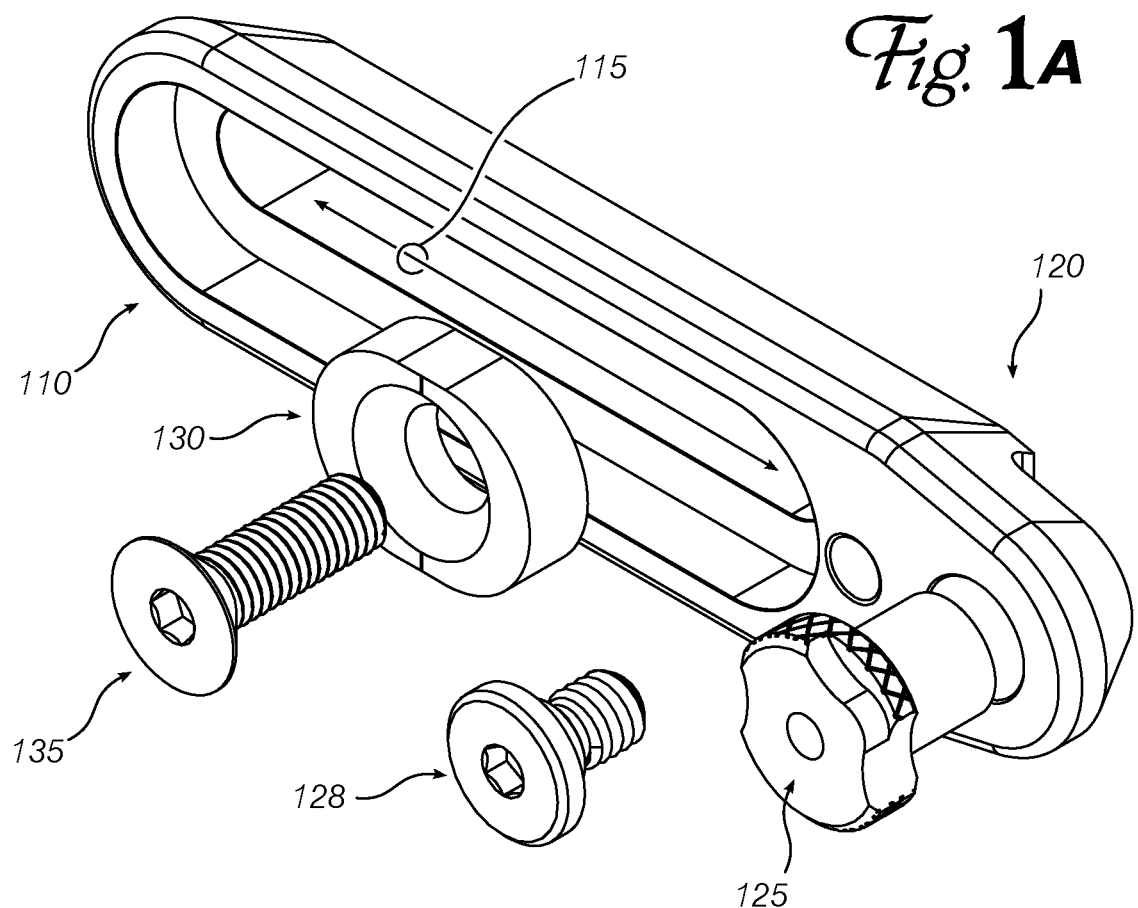
FIGS. 1A and 1B show exploded and assembled perspective views of an embodiment of the invention, respectively.

FIG. 1A shows an exploded perspective view of the principal elements of an embodiment. The main element is an oblong bar 110 having a stepped slot 115 along its length. At one end (120), a drill guide 125 is installed. Preferably, removable drill guides are used so that drills of different diameters can be accommodated. A set screw 128 holds the drill guide in place.

A securing slider 130 can be positioned at a desired location along the stepped slot, and secured at the location using a threaded fastener 135. This fastener may be chosen to match the size and thread of a tapped hole in the structure to be repaired; fastener 135 temporarily replaces the normal bolt that is installed in the tapped hole and secures or clamps the tool against the structure.

Figure 1B:
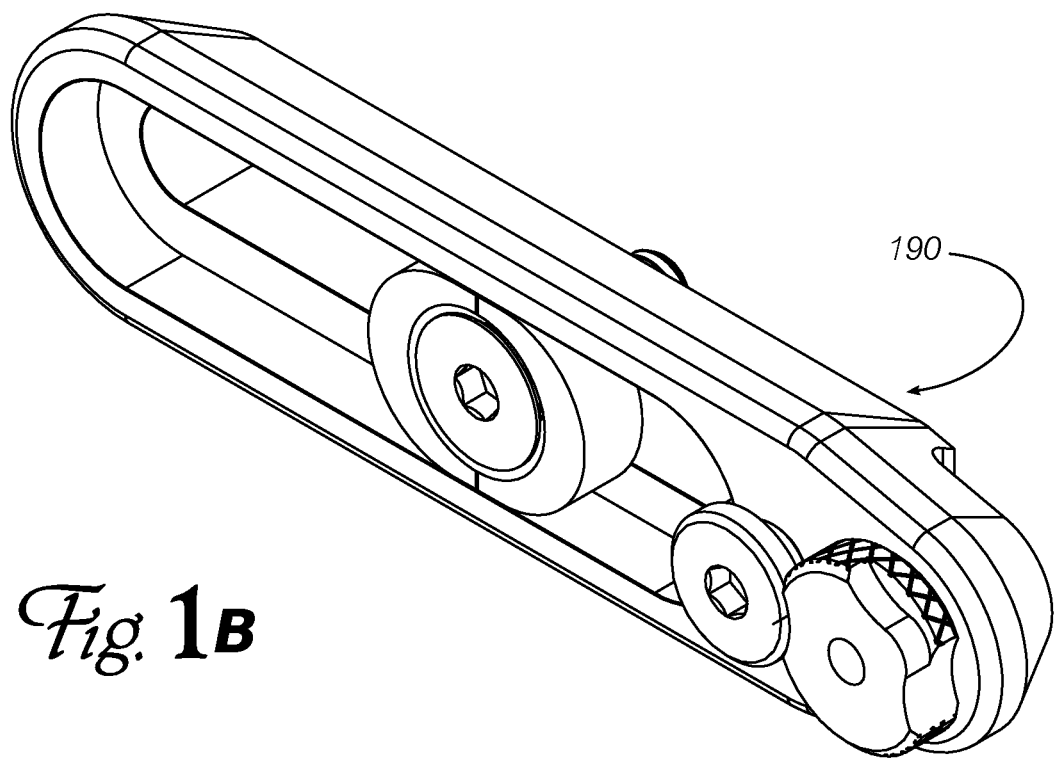

FIG. 1B shows the same tool in an assembled state; the back size of oblong bar 110 (at 190, not visible in this view) would be clamped firmly against the structure to be repaired by one or more threaded fasteners passing through a like number of securing sliders in the stepped slot.

Figure 2:
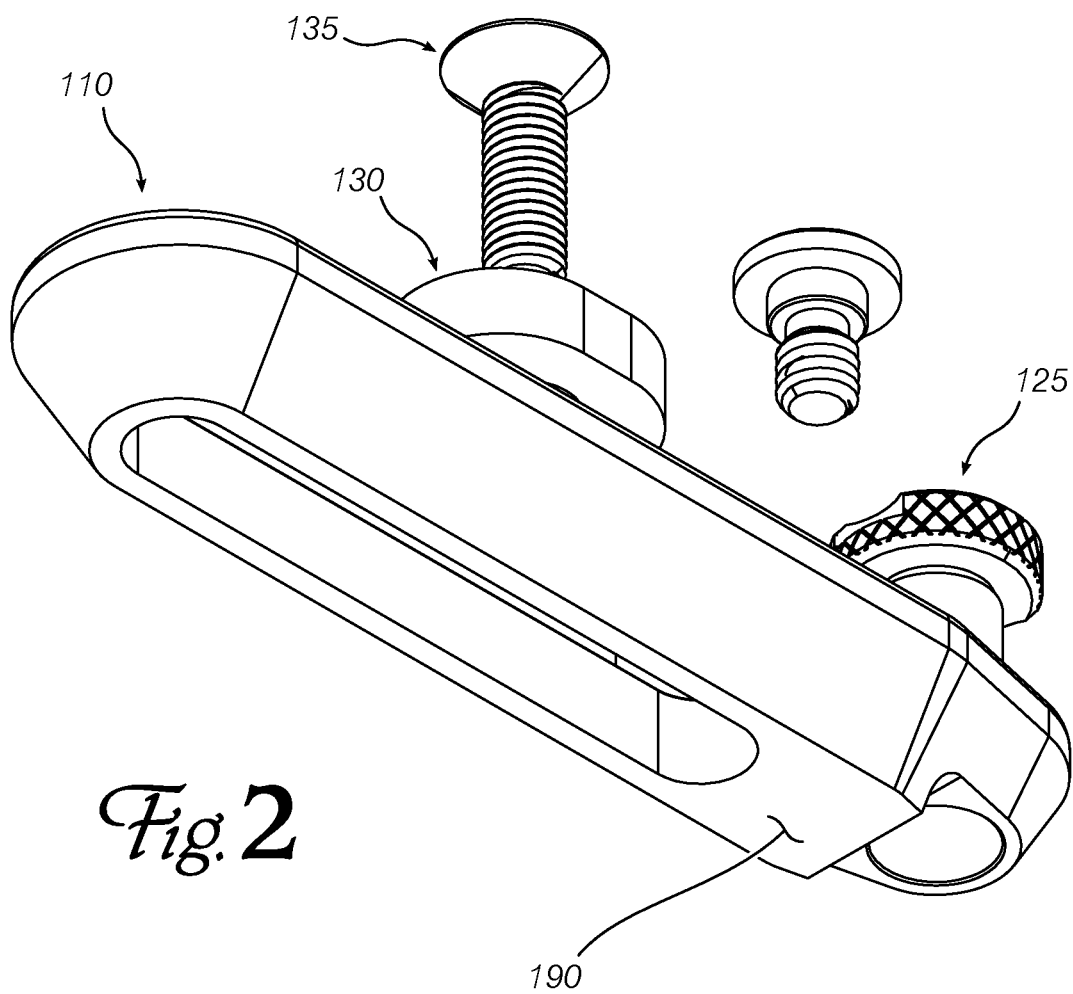
FIG. 2 shows a perspective view of the embodiment from a different vantage.

FIG. 2 shows an exploded view of an embodiment from a different vantage point. Here, the lower surface 190 of the oblong, slotted bar 110 is visible. The slotted bar of an embodiment may be of any suitable length (or a kit comprising tool parts may include several bars of different lengths, which all accept the same-sized securing sliders and other accessories). Longer bars may be secured with a plurality of securing sliders, while shorter bars may only need one.

Figure 3:
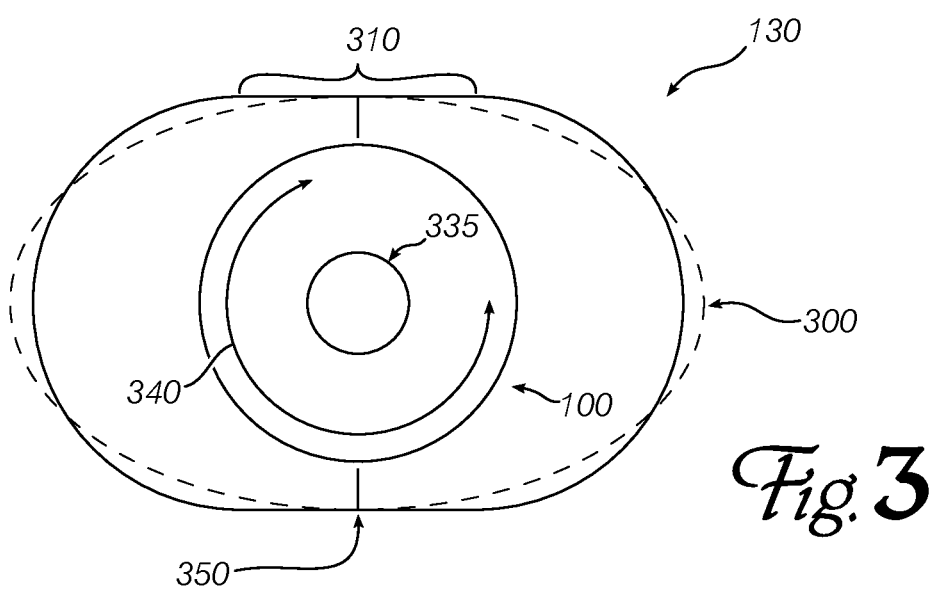
FIG. 3 shows a plan view of a securing slider of one embodiment of the invention.

FIG. 3 shows plan view of a securing slider 130 of an embodiment of the invention. This slider is oval, which is specifically defined herein to mean a shape having two facing semicircular ends joined by straight edges 310. In particular, note that "oval" does not mean "elliptical." An ellipse is shown in dashed lines at 300, and the differences between the ellipse and the oval slider are apparent.

A securing slider of an embodiment has a hole 335 through which a threaded fastener may pass, and is sized and shaped to allow the slider to travel along the stepped slot in the oblong bar of an embodiment. Preferably, the shape is such that the securing slider cannot rotate around the threaded fastener while the slider is in the slot. The oval shape depicted here cannot rotate in the slot.

Securing sliders preferably have a beveled or chamfered area 340 surrounding hole 335 so that a threaded fastener with a countersunk head or a cone-bottom nut will self-center in the slider when tightened. In addition, a securing slider may be marked, etched or notched with a reference mark 350 near the location of hole 355, in a direction perpendicular to the travel of the slider along the stepped slot.

Figure 4:
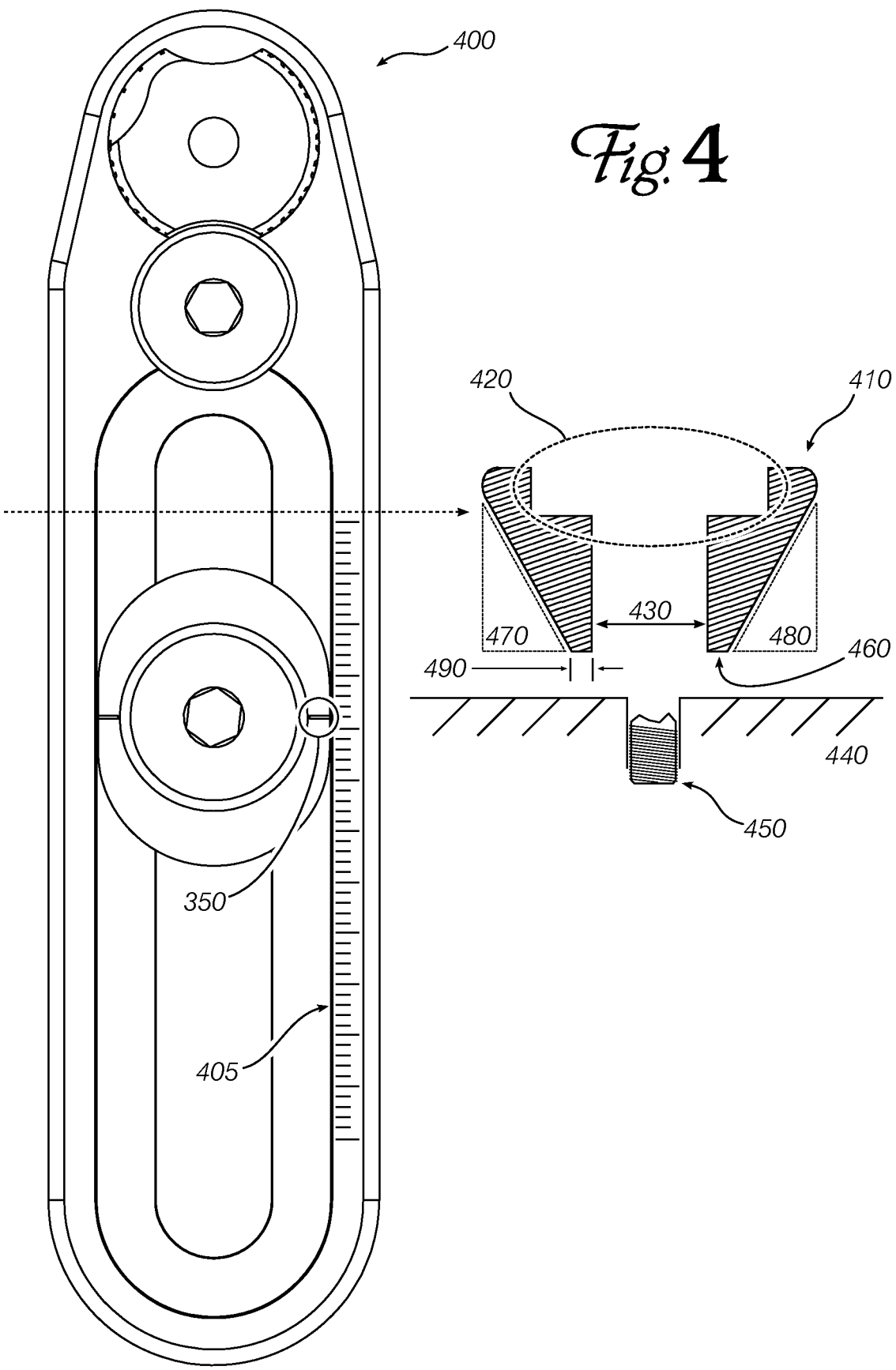
FIG. 4 shows a plan view of an embodiment, with a section through a portion thereof.

FIG. 4 shows a top view of an embodiment of the invention 400, with a cross-section of the oblong bar at 410. In the cross section, a wider portion of the stepped slot is visible at 420; this is where the secured slider of an embodiment travels. Below this area (between the slider and the surface of the structure to be repaired at 440), a narrower portion of the stepped slot 430 allows threaded fasteners to pass through the slotted oblong bar. The sides of the oblong bar may be provided with relief cuts (i.e., material may be removed as shown by dashed triangles 470 and 480) so that only a narrower portion 490 of the lower surface of the oblong bar 460 comes in contact with the structure to be repaired 440. Element 450 indicates a broken threaded fastener in structure 440.

The reference mark on the securing slider at 350 may be complemented by marks along the top surface of the oblong bar at 405; these marks may be used to indicate the distance between the threaded fastener through the securing slider and the center of the drill guide.

Figure 5:
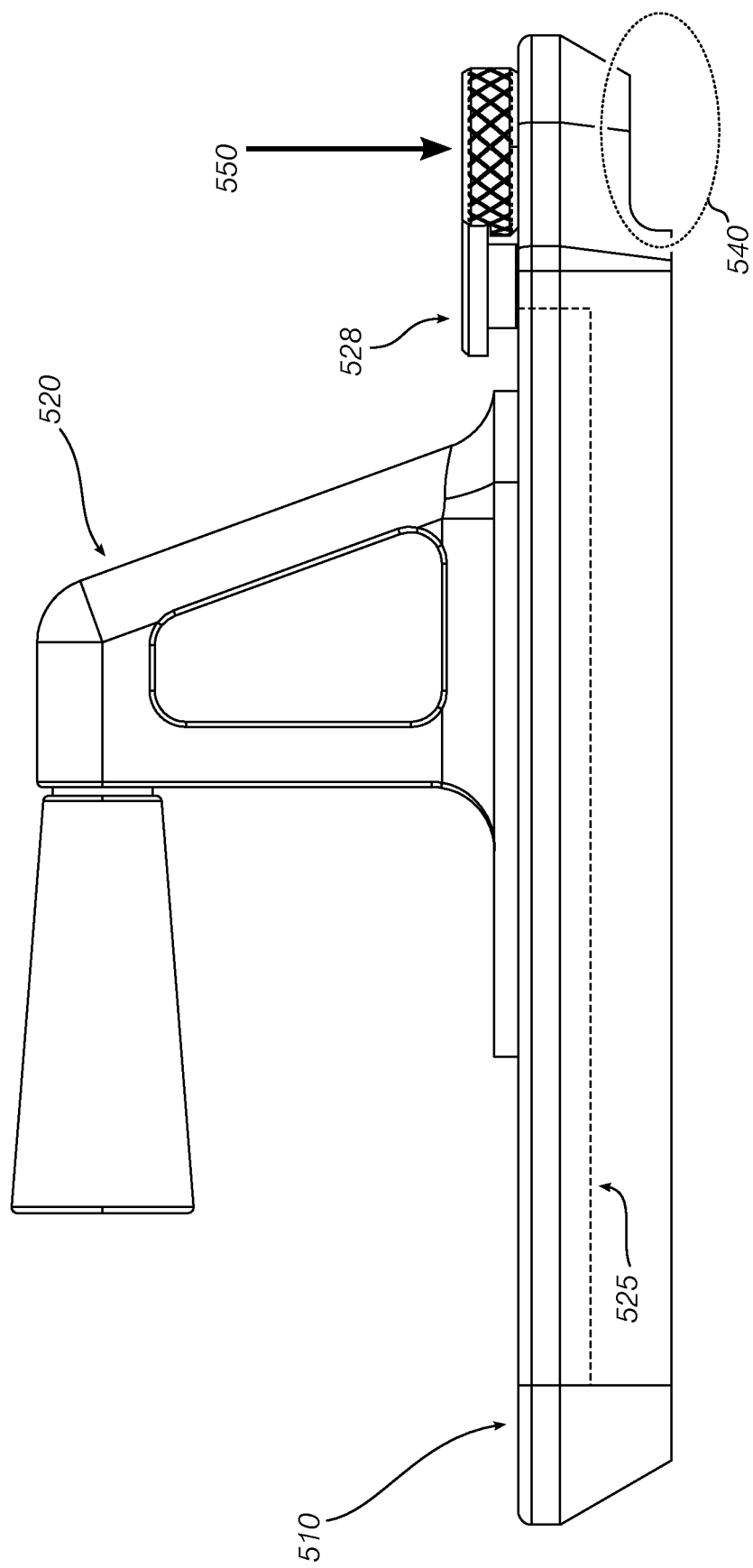
FIG. 5 shows a side view of an embodiment.

FIG. 5 shows a side view of an embodiment of the invention. In this embodiment, the oblong bar 510 is longer, and there is a handle 520 whose base (dashed lines 525) rests in the stepped slot where the securing sliders would otherwise travel. The base of handle may be held in the slot by same set screw 528 that secures the drill guide. Handle 520 may allow the operator to manipulate the embodiment more accurately during setup, or to detect flexing and other problems during drilling.

In this side view, a chip-relief gap is visible at 540, between the bottom face of the oblong bar and the surface of the structure to be repaired below. Thus, when drilling through the drill guide at 550, chips can be gathered (e.g. by vacuum) closer to the surface of the structure.

An embodiment may be constructed of any suitable strong, tough, dimensionally-stable material, or combinations of such materials. For example, anodized aluminum may be appropriate for many applications. Severe-duty embodiments may be made from steel or titanium. The slotted oblong bar may be made from the same material as the securing sliders, or from different material. The bar and/or sliders may be finished with a tough coating to protect both the tool and the surface of the structure to be repaired. The coating may be, for example, anodized aluminum oxide or ployetrafluoroethylene (PTFE, brand-name Teflon®). The tool may be given a distinctive coloration characteristic of a particular brand. For example, tools produced by Beydler CNC of Lebanon, Oreg. have a blue anodized surface coating.

An embodiment may be provided with an assortment of securing sliders having different diameters of holes (to suit different diameters of threaded fasteners). If the sliders have beveled upper surfaces around the hole, then corresponding beveled/flat-head threaded fasteners of a variety of sizes will self-center in the hole, thus reducing the number of sliders that are necessary.

Similarly, to increase the number of structures that can be repaired by an embodiment, interchangeable drill guides of varying diameters may be provided. These may be held in place in a single drill-guide hole at one end of the slotted oblong bar, the size of the drill-guide hole being slightly larger than the largest-diameter drill that will be used to drill out a broken threaded fastener.

An embodiment may include a sighting device that fits in the drill-guide hole and emits a small indicator such as a laser spot to assist in aligning the device over the broken threaded fastener. Once aligned, the sighting device may be removed from the drill-guide hole and an ordinary drill guide of suitable diameter installed. (The chip-relief gap at 540 in FIG. 5 facilitates the viewing of this sighting indicator as well.)

Figure 6:
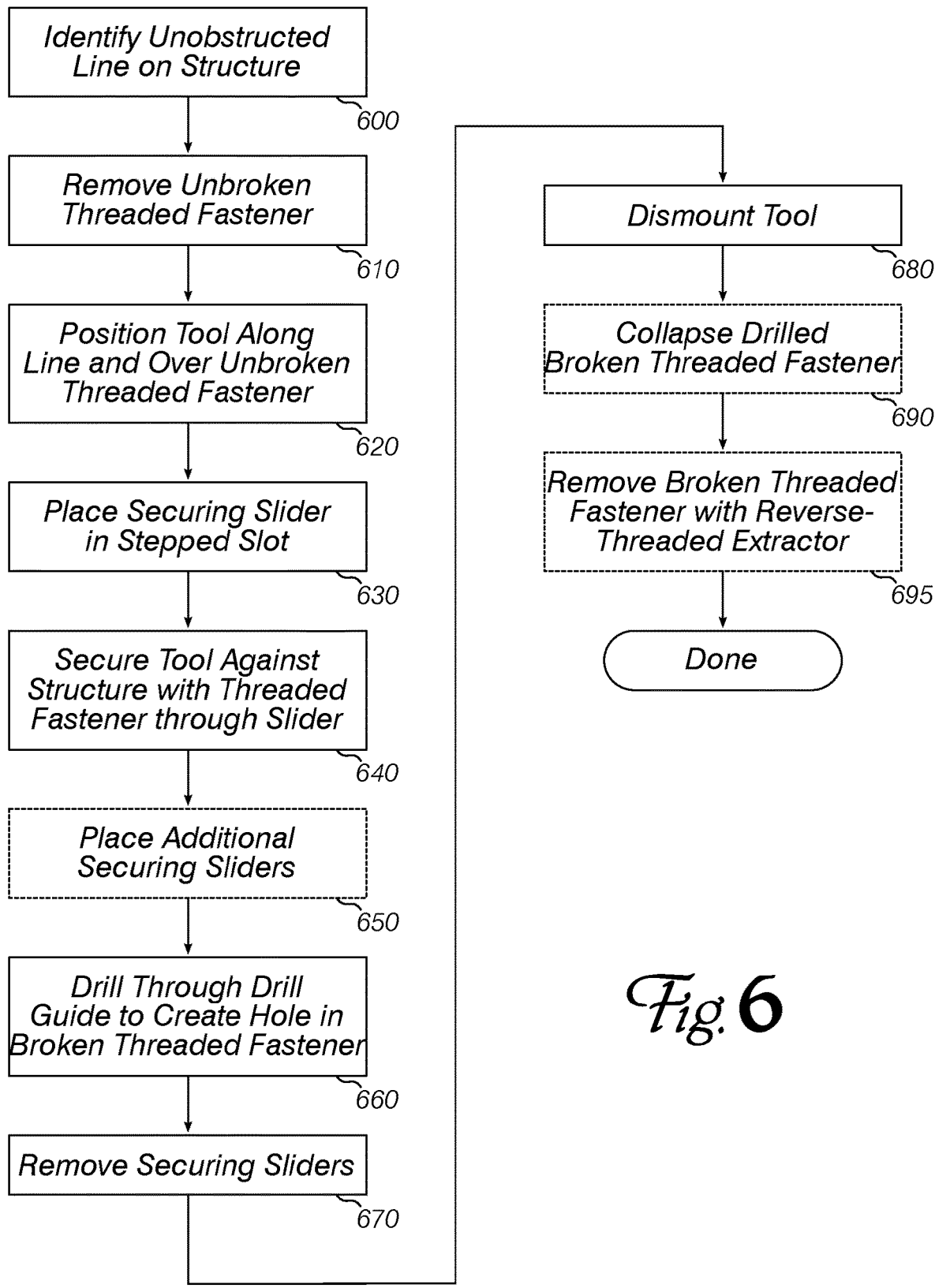
FIG. 6 outlines a method of using an embodiment of the invention.

To use an embodiment of the invention to drill out and remove a broken threaded fastener from a structure, the operation may proceed as outlined in FIG. 6. First, an unobstructed line between the broken threaded fastener and an unbroken threaded fastener is identified (600). The line should pass along a flat surface of the structure. The unbroken threaded fastener is removed (or, if the fastener is secured in the structure, then an associated nut is removed) (610). The slotted oblong tool according to an embodiment is placed against the structure with the slot along the identified line, so that the unbroken threaded fastener passes through the slot and the center of the drill guide is over the broken threaded fastener (620).

At least one securing slider is placed in the stepped slot at the location of the unbroken threaded fastener (630) and a beveled threaded fastener (or a cone nut) is tightened to secure the oblong tool against the structure (640). If the slot in the oblong tool passes over other unbroken threaded fasteners, additional securing sliders can be fixed at those locations to improve the stability of the tool fixation (650).

Finally, the operator drills through the drill guide and into the broken threaded fastener to create a hole in the broken threaded fastener (660). When the hole is complete, the threaded fasteners at the securing sliders are removed (670), and the tool is dismounted from the structure (680). Then, the broken threaded fastener can be removed by collapsing the shell of the fastener into the hole that was drilled (690), or by inserting a reverse-threaded extractor into the hole and using the extractor to turn the broken fastener (695).

The applications of the present invention have been described largely by reference to specific examples and in terms of particular physical structures or features. However, those of skill in the art will recognize that improved positioning and alignment of holes drilled with a hand drill can also be accomplished by tool guides that are configured differently than described above. Those different configurations are understood to be captured according to their possession of the elements recited in the following claims.

We claim:

1. A tool comprising:
    an oblong bar having a width, a length and a thickness measured from a top surface to an opposite bottom surface, with a stepped slot formed along most but not all of the length and fully through the thickness so that a wider portion of the stepped slot is exposed on the top surface and a narrower portion of the stepped slot is exposed on the bottom surface,
    the oblong bar further having a bevel relief extending at least half-way up the thickness of the oblong bar so that the bottom surface of the oblong bar is narrower than the top surface of the oblong bar;
    a drill guide at one end of the oblong bar;

an oval securing slider sized to travel along the stepped slot in a direction of the length of the oblong bar, said oval securing slider having a hole; and a threaded fastener received in the hole of the oval securing slider, said threaded fastener sized and shaped to hold the oval securing slider in the stepped slot, and to hold the bottom surface of the oblong bar with the oval securing slider in the stepped slot against a face of a structure to be repaired.

2. The tool of claim 1 wherein the hole of the oval securing slider has a beveled entry.

3. The tool of claim 2 wherein the threaded fastener has a countersunk head.

4. The tool of claim 2 wherein the threaded fastener is a cone nut.

5. The tool of claim 1 wherein the oval securing slider is shaped to prevent rotation of the oval securing slider around an axis of the hole as the oval securing slider travels along a length of the stepped slot.

6. The tool of claim 5 wherein a view of the oval securing slider along an axis of the hole has two facing semicircular ends joined by straight edges.

7. The tool of claim 5 wherein the oval securing slider comprises a reference mark perpendicular to a direction of travel of the oval securing slider along the length of the stepped slot, the oblong bar further comprising:

a plurality of marks along the oblong bar, perpendicular to the length of the stepped slot.

8. The tool of claim 1 wherein the oblong bar comprises:
a drill-guide receptacle at the one end; and
the drill guide is received in the drill-guide receptacle.

9. The tool of claim 1 wherein the oblong bar comprises:
a chip relief on the bottom surface at the drill-guide end of the oblong bar, said chip relief standing shy of the surface of the structure to be repaired.

10. The tool of claim 1, further comprising:
a handle having a base configured to be held in the stepped slot by a set screw that also holds the drill guide,
said handle including a graspable portion above the top surface that is suitable for holding by an operator of the tool.

11. The tool of claim 1 wherein the oblong bar is constructed from anodized aluminum.

12. The tool of claim 1 wherein the oblong bar is constructed from steel.

13. The tool of claim 1 wherein the oval securing slider is constructed from a material identical to a material of the oblong bar.

14. The tool of claim 1 wherein the oval securing slider is constructed from a material different from a material of the oblong bar.

15. The tool of claim 1, further comprising:
a sighting device adapted to be coupled at the drill guide.

* * * * *